(12) United States Patent
Gross et al.

(10) Patent No.: US 7,870,958 B1
(45) Date of Patent: Jan. 18, 2011

(54) SHIPPING INSERT FOR PROTECTING A MOTOR VEHICLE WINDOW PANEL AND ATTACHED MOLDING DURING SHIPPING AND HANDLING

(75) Inventors: Bradley M. Gross, Tipp City, OH (US); Marvin O. Reynolds, Troy, OH (US)

(73) Assignee: Creative Extruded Products, Inc., Tipp City, OH (US)

( * ) Notice: Subject to any disclaimer, the term of this patent is extended or adjusted under 35 U.S.C. 154(b) by 0 days.

(21) Appl. No.: 12/655,732

(22) Filed: Jan. 6, 2010

(51) Int. Cl.
*B65D 85/48* (2006.01)

(52) U.S. Cl. .................. 206/448; 206/454; 206/594

(58) Field of Classification Search .............. 206/591, 206/592, 594, 586, 448, 454, 451
See application file for complete search history.

(56) References Cited

U.S. PATENT DOCUMENTS

| | | | | |
|---|---|---|---|---|
| 3,334,798 A | * | 8/1967 | Pezely, Jr. et al. | 206/594 |
| 3,404,826 A | * | 10/1968 | Carmody | 206/523 |
| 4,182,450 A | * | 1/1980 | Kryger | 206/448 |
| 4,202,452 A | * | 5/1980 | McCormick | 211/41.14 |
| 4,805,774 A | * | 2/1989 | Salisbury | 206/454 |
| 6,769,700 B2 | | 8/2004 | Ortmuller et al. | |
| D606,474 S | | 12/2009 | Schlater | |
| 2002/0023857 A1 | * | 2/2002 | Smith | 206/588 |

* cited by examiner

*Primary Examiner*—Jacob K Ackun, Jr.
(74) *Attorney, Agent, or Firm*—Jacox, Meckstroth & Jenkins

(57) ABSTRACT

A motor vehicle window panel or windshield has a lower edge portion with an attached extruded plastic molding having a downwardly projecting portion defining a cavity with an inlet gap for receiving a projecting fin on a cowl panel. A shipping insert of extruded substantially rigid plastics material supports the windshield and attached molding during shipping and handling and includes a base portion adapted to seat on shipping container support members and a tongue portion spaced above the base portion and projecting through the inlet gap into the cavity to support the molding. The insert also has an upper portion supporting a solid locating flange of the molding attached to a bottom edge of the windshield. The base portion of the insert has inclined opposite edge surfaces to facilitate sliding on the support members, and also has an upwardly projecting hook rib for retaining the insert on the molding.

10 Claims, 1 Drawing Sheet

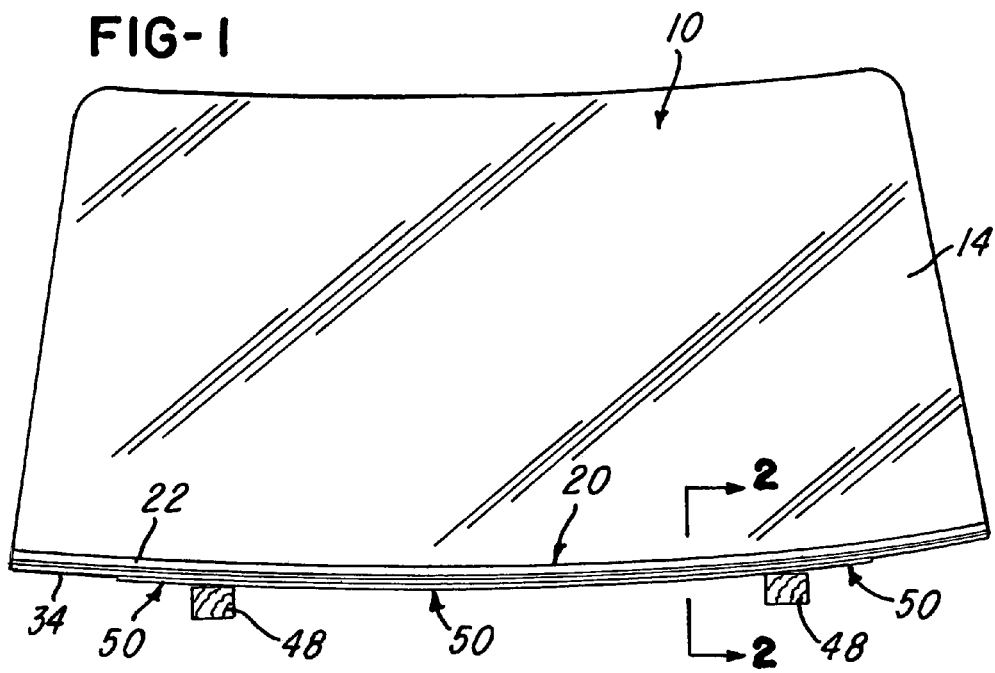
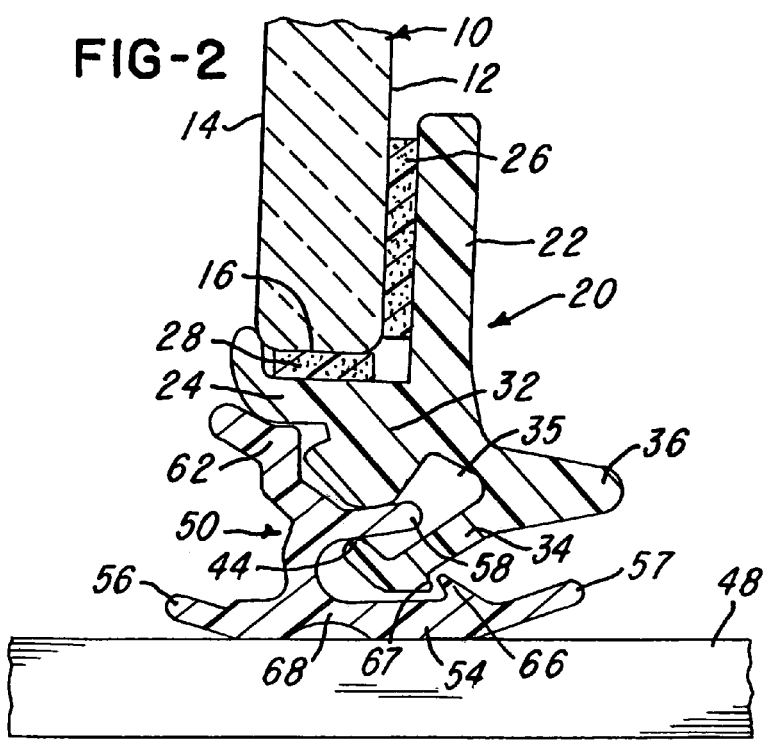

SHIPPING INSERT FOR PROTECTING A MOTOR VEHICLE WINDOW PANEL AND ATTACHED MOLDING DURING SHIPPING AND HANDLING

BACKGROUND OF THE INVENTION

This invention relates to extruded plastic moldings which are attached to window panels or windshields of a motor vehicle, for example, a molding as disclosed in U.S. Design Pat. No. D606,474 which issued to the assignee of the present invention, and as disclosed in U.S. Pat. No. 6,769,700. The extruded plastic molding is usually reinforced with an embedded strip such as a metal foil and is attached to an edge portion of the windshield, for example, by foam tape with pressure sensitive contact adhesive. One form of molding used for sealing a windshield includes a flexible portion which defines a cavity for receiving a fin that projects from a cowl panel extending adjacent the bottom edge portion of the windshield.

After the molding is attached to the bottom edge portion of the windshield, the windshield and attached molding are usually shipped in a vertical or upright position with the molding resting or seated on two spaced support members or rails on the bottom wall of a shipping container. In this position, the entire weight of the windshield is applied through the lower molding to the two support rails. This weight at the two support rails when combined with the stresses of handling and shipping, frequently causes changes in the orientation of the lower molding or deforms the flexible portion of the molding. Sometimes, a large U-shaped shipping clip is used to receive the lower edge portion of the windshield and the bottom molding in the area of each of the support rails on the bottom of the shipping container. However, when the shipping clips are used, the entire weight of the windshield is transferred through the molding to the two shipping clips, and frequently causes distortion or deformation of the molding. It is also known to insert a removable spacer strip into the entrance gap of the cavity within the molding to prevent the gap from closing above the support rails.

SUMMARY OF THE INVENTION

The present invention is directed to a shipping insert which receives and engages a solid portion of the molding mounted on the bottom edge portion of a window panel or windshield and supports the weight of the windshield without transferring the weight through any flexible bottom portion of the molding to the supports within the shipping container. In the embodiment illustrated herein, the shipping insert is an elongated extrusion of substantially rigid plastics material and extends along the bottom of the windshield from one support rail to the other support rail for distributing the weight of the windshield along the length of the molding while also maintaining the cross-sectional shape or profile of the molding. The insert may also include a tongue portion which projects into the longitudinally extending cavity within the molding through the entrance gap to prevent deformation of the flexible bottom portion of the molding and to maintain the shape of the molding for receiving the projecting fin of the cowl panel. The shipping insert may also incorporate an upwardly projecting hook-shaped rib or fin for retaining the shipping insert on the molding in the position to support the windshield through the molding. The molding may also have inclined bottom edge surfaces to provide for conveniently shifting or sliding the windshield and attached molding on the supports within the shipping container.

Other features and advantages of the invention will be apparent from the following description, the accompanying drawing and the appended claims.

BRIEF DESCRIPTION OF THE DRAWING

FIG. 1 is an elevational view of a vertical motor vehicle windshield with an attached molding for receiving a cowl panel and supported by a shipping insert constructed in accordance with the invention; and FIG. 2 is an enlarged fragmentary cross-section of the windshield, molding and shipping insert, taken generally on the line 2-2 of FIG. 1 and showing the shipping insert supporting the windshield through the molding to protect the molding attached to the windshield.

DESCRIPTION OF THE PREFERRED EMBODIMENT

Referring to FIG. 1, a motor vehicle glass window panel in the form of a front windshield 10 has an inner surface 12 and a parallel outer surface 14 which are connected by a bottom edge surface 16. The bottom edge portion of the windshield 10 receives a molding 20 which is extruded of a plastics material and of the general type disclosed in above-mentioned Design Pat. No. D606,474 and U.S. Pat. No. 6,769,700. The molding 20 forms a weather-proof seal between the lower edge portion of the windshield 10 and a molded plastic cowl panel (not shown) which extends across the vehicle body in front of and at the bottom of the windshield 10.

The molding 20 includes a mounting flange portion 22 integrally connected to a locating flange portion 24, and a foam tape 26 with pressure sensitive contact adhesive secures the flange portion 22 to the inner surface 12 of the windshield. A similar foam tape 28 secures the locating flange portion 24 to the bottom edge surface 16 of the windshield. The molding 20 also includes a lower intermediate portion 32 which is below the edge surface 16 of the windshield 10 and which cooperates with a hook-shape flexible bottom portion 34 to define a cavity 35. The molding also has a positioning flange portion 36. The hook-shape bottom portion 34 and the lower intermediate portion 32 also define an entrance gap 44 for the cavity 35. The molding may also have an embedded reinforcing strip or metal foil, as shown in the above-mentioned patents. After the windshield 10 and attached molding 20 are installed in a motor vehicle, the cavity 34 receives a rib or fin (not shown) which projects from the molded plastic cowl panel, for example, as disclosed in FIG. 2 of above-mentioned U.S. Pat. No. 6,769,700.

The windshield 10 and attached molding 20 are commonly shipped in a vertical or upright position in a shipping container, commonly in the form of a paperboard box having a pair of parallel spaced support members or rails 48 positioned on and attached to the bottom wall of the shipping container. As mentioned above, if the molding 20 directly engages the support members or rails 48, the weight of the windshield, which is commonly within the range of 30 to 40 lbs., is concentrated on the bottom flexible portion 34 of the molding over the support rails 48, and the loading distorts or collapses the bottom portion 34 of the molding in the areas above the support rails.

In accordance with the present invention, an elongated shipping insert 50 engages the molding 20 and supports the weight of the windshield 10 directly through one or two solid portions of the molding 20, preferably continuously from one support rail 48 to the other support rail, as shown in FIG. 1. As shown in FIG. 2, the shipping insert 50 is preferably formed from an extrusion of substantially rigid thermoplastic material such as PVC having a Shore D durometer within the range of 39-90. The shipping insert 50 includes a base portion 54 having inclined opposite edge portions 56 and 57 each having an inclined bottom surface. The insert 50 also includes a tongue portion 58 spaced above the base portion 54 and which projects generally horizontally into the cavity 35 through the entrance gap 44. The tongue portion 58 engages and supports the solid intermediate portion 32 of the molding 20 and prevents the flexible bottom portion 34 from being deformed upwardly by the weight of the windshield 10 to close the entrance gap 44 for the cavity 34.

The shipping insert 50 also includes an upper portion 62 which supports the solid locating flange portion 24 attached to the bottom edge surface 16 of the windshield 10 and cooperates with the tongue portion 58 to support the entire weight of the windshield 10. As also shown in FIG. 2, the base portion 54 of the shipping insert 50 includes an upwardly projecting hook-shape locking rib or fin 66 which is inclined and opposes a hook-shaped surface 67 on the bottom portion 34 of the molding 20. This fin 66 retains the shipping insert 50 on the molding 20. The base portion 54 has a slightly thinner wall section 68 which permits slight flexing of the base portion 54 to release the hook-shaped fin 66 from the opposing hook-shaped surface 67 on the bottom portion 34 of the molding 20 when it is desired to remove the shipping insert.

From the drawing and the above description, it is apparent that a shipping insert constructed in accordance with the present invention provides desirable features and advantages. As one advantage, the shipping insert 50 protects the molding 20 and is effective to support the entire weight of the windshield 10 and the molding 20 without distorting or collapsing the bottom flange portion 34 of the molding. The tongue portion 58 also maintains the inlet gap 44 for the cavity 34 while supporting weight of the windshield 10 through the solid intermediate portion 32 of the molding. In addition, the inclined bottom surfaces on the edge portions 56 and 57 of the shipping insert 50 facilitate sliding of the windshield 10 laterally on the support members or rails 48 since a number of the windshields with attached moldings are positioned within the shipping container. In addition, the undercut surface on the hook-shape fin 66 cooperates with the undercut surface 67 on the bottom flange portion 42 of the molding 20 to retain the shipping insert 50 on the molding 20 during handling and shipping of the windshield 10 with the attached molding 20.

While the form of shipping insert herein described constitutes a preferred embodiment of the invention, it is to be understood that the invention is not limited to this precise form of shipping insert, and that changes may be made therein without departing from the scope and spirit of the invention as defined in the appended claims.

What is claimed is:

1. In combination with a motor vehicle window panel having an attached elongated molding of extruded plastics material, a shipping insert protecting said panel and said molding during shipping and handling,
    said molding including a mounting flange portion attached to an inside surface of said window panel and a lower intermediate portion projecting downwardly from and attached to a bottom edge surface of said window panel,
    said molding further including a bottom flange portion connected to said intermediate portion and cooperating with said intermediate portion to define a longitudinally extending cavity having an inlet gap adapted to receive a projecting fin of a vehicle panel,
    said shipping insert comprising a one-piece body of extruded substantially rigid material with said body including a base portion adapted to seat on a support member within a shipping container,
    said body of said insert further including a tongue portion spaced above said base portion and projecting through said inlet gap into said cavity, and
    said tongue portion engaging and supporting said intermediate portion of said body and effective to maintain said inlet gap and prevent said bottom flange portion of said molding from collapsing when said base portion is supporting the weight of said window panel and said molding mounted on said panel.

2. The combination defined in claim 1 wherein said body of said insert includes a solid upper portion projecting above said tongue portion and supporting a solid flange portion of said molding under said edge surface of said window panel.

3. The combination defined in claim 1 wherein said base portion of said insert includes an upwardly projecting rib horizontally opposing a bottom portion of said molding to aid in retaining said insert on said molding.

4. The combination defined in claim 1 wherein said base portion of said insert has at least one inclined bottom ramp surface to facilitate sliding said insert, said molding and said window panel as a unit on the support member.

5. The combination defined in claim 1 and further including two horizontally spaced support members supporting said window panel and said attached molding, and said shipping insert extends between and over said support members.

6. In combination with a motor vehicle window panel having an attached molding of extruded plastics material, a shipping insert protecting said panel and said molding during shipping and handling,
    said molding including a mounting flange portion attached to an inside surface of said window panel and an intermediate portion projecting downwardly from and attached to a bottom edge surface of said window panel,
    a bottom flexible portion extending from said intermediate portion,
    said shipping insert comprising a one-piece body of extruded substantially rigid material with said body including a base portion adapted to seat on a support member within a shipping container,
    said body of said insert further including a solid upper portion supporting a solid flange portion of said molding under said bottom edge surface of said window panel, and
    said shipping insert preventing said bottom flexible portion of said molding from collapsing when said base portion and said upper portion of said insert are supporting the weight of said window panel and said molding mounted on said panel.

7. The combination defined in claim 6 wherein said base portion of said shipping insert includes an upwardly projecting rib horizontally opposing a bottom portion of said molding to aid in retaining said insert on said molding.

8. The combination defined in claim 6 wherein said base portion of said insert has at least one inclined bottom ramp surface to facilitate sliding said insert, said molding and said window panel as a unit on the support member.

9. The combination defined in claim 6 wherein said intermediate portion and said bottom flexible portion of said molding defines a longitudinally extending cavity having an inlet gap, and said body of said insert includes a tongue portion spaced above said base portion and projecting through said inlet gap into said cavity.

10. The combination defined in claim 6 and further including two horizontally spaced support members supporting said window panel and said attached molding, and said shipping insert extends between and over said support members.

* * * * *